US008330615B2

(12) United States Patent
Hagen

(10) Patent No.: US 8,330,615 B2
(45) Date of Patent: Dec. 11, 2012

(54) POWER SUPPLY SYSTEM FOR DOWNHOLE NETWORK

(75) Inventor: Trond Hagen, Sandefjord (NO)

(73) Assignee: Roxar Flow Measurement AS, Stavanger (NO)

( * ) Notice: Subject to any disclaimer, the term of this patent is extended or adjusted under 35 U.S.C. 154(b) by 650 days.

(21) Appl. No.: 12/518,117

(22) PCT Filed: Nov. 29, 2007

(86) PCT No.: PCT/NO2007/000426
§ 371 (c)(1),
(2), (4) Date: Nov. 24, 2009

(87) PCT Pub. No.: WO2008/069677
PCT Pub. Date: Jun. 12, 2008

(65) Prior Publication Data
US 2010/0117854 A1    May 13, 2010

(30) Foreign Application Priority Data

Dec. 8, 2006  (NO) .................................. 20065672

(51) Int. Cl.
*G01V 3/00* (2006.01)
(52) U.S. Cl. ............... 340/853.1; 340/854.4; 340/854.8; 340/854.3
(58) Field of Classification Search ............... 340/853.1, 340/854.4, 854.8, 854.3, 853.7, 854.9; 367/82
See application file for complete search history.

(56) References Cited

U.S. PATENT DOCUMENTS

| 3,659,336 A * | 5/1972 | Horne .............................. 29/605 |
| 5,216,285 A * | 6/1993 | Hilsenteger et al. ............ 307/12 |
| 5,326,970 A * | 7/1994 | Bayless ...................... 250/269.1 |
| 6,128,508 A * | 10/2000 | Francisco et al. .......... 455/552.1 |
| 6,344,781 B1 * | 2/2002 | Slenker ......................... 333/181 |
| 6,369,718 B1 * | 4/2002 | Mathieu ..................... 340/853.7 |
| 6,958,704 B2 | 10/2005 | Vinegar et al. |
| 2003/0010493 A1 | 1/2003 | Hill et al. |
| 2004/0263350 A1 | 12/2004 | Vinegar et al. |

OTHER PUBLICATIONS

International Search Report for PCT/NO2007/000426, mailed Oct. 14, 2008.
International Preliminary Report on Patentability for PCT/NO2007/000426, dated Jan. 14, 2009.
Norwegian Search Report for Norway Application No. 2006 5672, dated Jul. 8, 2007.

* cited by examiner

*Primary Examiner* — Jean B Jeanglaude
(74) *Attorney, Agent, or Firm* — Nixon & Vanderhye P.C.

(57) ABSTRACT

An electric system for measurement and control in an oil/gas well using transmission of electric signals and supply of electric power. The system is provided with a current loop having an essentially constant current in a current loop and a number of downhole network nodes (1N) which are connected to the system.

22 Claims, 6 Drawing Sheets

POWER SUPPLY SYSTEM FOR DOWNHOLE NETWORK

This application is the U.S. national phase of International Application No. PCT/NO2007/000426 filed 29 Nov. 2007, which designated the U.S. and claims priority to Norway Application No. 2006 5672 filed 8 Dec. 2006, the entire contents of each of which are hereby incorporated by reference.

TECHNICAL FIELD OF THE INVENTION

The present invention relates generally to monitoring and control of downhole instrumentation systems for use in activities related to oil and gas.

In particular the invention relates to an electric power supply network providing power to downhole instrumentation and control modules and possibly a communications network for providing communication between such downhole instrumentation and control modules and between each module and a common network control unit.

BACKGROUND OF THE INVENTION

In subterranean wells there is an increasing demand for monitoring and controlling downhole devices and systems, for example sensors and instrumentation or control devices. There is a trend towards attempting to bring such instrumentation closer and closer to the actual hydrocarbon reservoir regions and towards multi-well exploration techniques for enabling the extraction of a higher fraction of the hydrocarbon resources available in such reservoirs. At the same time it is desirable to distribute instrumentation and measurement devices at a larger number of locations in order to be able to measure and assess the performance of the well production at more measurement points. A main objective of such measurements is to be able to obtain as accurate measures as possible of the reservoir pressure and temperature, and a secondary objective is to be able to locate possible problems at an early stage.

Hence it is vital to be able to provide systems capable of operating under the relevant conditions and which provides an operator with improved data on the conditions and performance of completed wells.

As an example of the state-of the art, U.S. Pat. No. 6,369,718 B1 to Mathieu describes an oil well monitoring and control system communication network where a twisted pair cable is used to connect well-related locations. A bus interface at a bus supervisor and each node is capable of supporting differential and common mode connection between the bus supervisor and each node, and between the nodes themselves. The interface provides high parallel impedance for differential mode connections and low series impedance for common mode connections. The bus interface comprises a cable having an armored, electrically conducting shell, where the armored shell can be used as the common mode electrical return path.

When trying to extend the solution described in the invention described in US '718 to larger number of nodes, larger depths and longer stretches of signal/power cables, the undesirable effect of increased voltage and power loss in the cable may become a limiting factor for system operation. When connecting more nodes at locations distant from the bus supervisor, the increasing total current requirement results in an increasing corresponding voltage drop down the length of the line. Hence, the supply line voltage at each node will vary depending on actual location along the supply line. Unless the node impedances are made very high, the input power requirement and power efficiency of such a system also may become a limiting factor. If, to the extent possible, the power efficiency is improved by increasing the node impedance, the resulting high impedance signal line will have a tendency to be susceptible to noise, generated internally by switching power demands in the nodes themselves, as well as noise from external sources.

Demands for increasing efficiency in extracting the hydrocarbon resources creates a corresponding demand for obtaining detailed information on the conditions on a well, a demand that can be met by providing more sophisticated measurement and control technology for use in such wells.

It is thus a first objective of the present invention to provide a solution for providing electric power to downhole instrumentation via a network connected to a network controller module. The system provides increased power efficiency in the system by minimizing the applied current, and provides improved communication signal immunity by not letting node current variations influence on the cable voltage and current conditions.

A second objective of the present invention is to provide a power supply system for external downhole instrumentation systems which has low susceptibility to variations in the node power consumption.

A third objective of the invention is to provide a network having high reliability in providing power and communication between downhole instrumentation and control modules and a network control module by reducing the need for components having low reliability (especially at high temperatures), such as large capacitors and inductors.

Yet another objective is to provide a network which allows communication with the nodes in the network while minimizing the resulting disturbances in the power supply.

THE INVENTION

According to the invention, the above stated objectives are achieved by providing an electric network for downhole power supply improving the possibilities for measurement and control for an oil/gas well using transmission of electric signals. The network is arranged as a current loop with one and only one top-side network controller and one or more downhole nodes. The plurality of downhole nodes are connected in series so that the same current runs through all nodes. The current running through the loop is adjustable between 50 and 200 mA, and its exact value is decided by the user and fed into the top-side network controller as an input parameter. With the network current set, the topside network controller will regulate to keep the loop current at a constant level irrespective of the loop impedance. Thus the output voltage of the top-side network controller will adapt automatically to the level needed to maintain the preset loop current.

Each of the plurality of down-hole nodes will accept any loop current in the chosen range, e.g. the abovementioned range, and regulate its voltage drop over the terminals to the minimum required to maintain the required node functionality. For basic functionality, according to a preferred embodiment of the invention, the minimum voltage is 9.0 Volts. For extended functionality the voltage may be higher. Immediately after power-up, each downhole node will be in basic functionality mode with node terminal voltage drop equal to 9.0 Volts. Extended functionality must always be chosen by means of a user command.

Thus, the output voltage of the top-side network controller will be automatically regulated to the sum of the terminal voltage drops over the plurality of down-hole nodes and the voltage drop due to resistive losses in the down-hole network cable.

The current that flows through a node, will supply all internal consumers in the node with the needed amount of current. If the node current is set to a larger value than what is needed to supply all consumers in a node, the excess current is bypassed to the next node. This bypassed current (multiplied with the terminal voltage drop) will be an unwanted power converted in the node and will dissipate heat. However, since the network loop current can be set in the top-side network controller, it can be optimized so that the need to bypass excess current is small.

The downhole network in the preferred embodiment of the invention will physically consist of a two-conductor cable with a grounded mantel. The two conductors are arranged as a twisted pair where all nodes are connected in series along one conductor and the return path from the bottommost node is in the other conductor, thus reducing the likelihood of noise disturbing the network operation, as no single large area induction loops will be capable of generating noise voltages due to electromagnetic field fluctuations or noise.

When communicating with the nodes, both power and signal will preferably be transmitted along the same two-conductor cable. The power is delivered by the top-side network controller and is transmitted as a constant current to the down-hole nodes. The signal will be transmitted as a small square pulse current variation superimposed on the already flowing current. The top-side network controller will transmit and receive signals to/from each of the downhole nodes while each of the downhole nodes will receive signals from and transmit signals to the top-side network controller (half-duplex).

Inside the downhole nodes, the signal current may be extracted from the constant loop current without any use of transformers or LC-filtering.

In a preferable embodiment of the network according to the invention, each of the at least one network nodes includes a Zener barrier device connected between its input terminals so as to provide a conducting path in parallel with the node in case of node failure. A Zener barrier device effectively works as a shunt device at voltages above the Zener voltage, thus being capable of providing a conducting parallel path, as soon as the Zener voltage of the diode is reached in case the current loop is broken in the relevant node.

In a still yet further preferable embodiment of the network according to the invention, the current loop is galvanically isolated from the main body of the well tubing. Keeping the current loop galvanically isolated provides improved safety for the control and instrumentation units connected to the network, as fault currents arising in other equipment do not easily leak into the network system as long as the galvanic isolation is effective.

In a further still preferable embodiment of the network according to the invention, each of the at least one network node are partly realized in SOI (Silicon-On-Insulator)-technology. SOI-technology is capable of operating at high temperatures, as is often encountered in downhole environments. Nodes realized on SOI-technology enables operation up to temperatures of 200° C., possibly also into the range of 200-300° C.

In a yet further still preferable embodiment of a network according to the invention, at least one downhole network node is adapted to provide a power supply to at least one external downhole module. One of the voltage regulators in the node itself could be used to provide power to at least one external downhole module. This way, the external downhole module draws power from the network, and does not have its own internal power source. This helps to reduce the size, weight and complexity of the downhole module itself.

Still further preferably, in a network according to the invention, at least one of the topside network nodes, e.g. the top side network controller is IWIS compatible in terms of physical size, power consumption and low level communication (IWIS=Intelligent Well Instrumentation Standardization). As IWIS is emerging as a standard interface for use with well instrumentation, it is beneficial to provide at least one network node with the necessary IWIS compatible interface. By incorporating IWIS in the topside node, the whole network can be considered IWIS-compatible. The downhole nodes in the network do not have to be IWIS-compatible.

Referring to the accompanying table I and II we see that with a series coupled system according to the invention, exemplified in table II, the cable voltage drop/power loss and the power efficiency is independent of the number of nodes. The only things that changes are the power and voltage fed into the system.

In a parallel coupled system exemplified in table I, in contrast we see that unless the Node DC input impedance is increased dramatically, the high cable power loss and low power efficiency will become very prohibitive. A very high input impedance is also highly unwanted in a subsea system since high impedance systems are very susceptible to induced voltages (i.e. they are very noisy)

The increase efficiency and reduced loss in the solution according to the invention, as is illustrated in table II, is especially important in relation to the use of the IWIS standard with its inherent power limitations.

The features and advantages of the present invention will become apparent to a person skilled in the art in light of the following detailed description of the invention with references to the appended drawings.

DETAILED DESCRIPTION OF A PREFERRED EMBODIMENT

Figure 1:
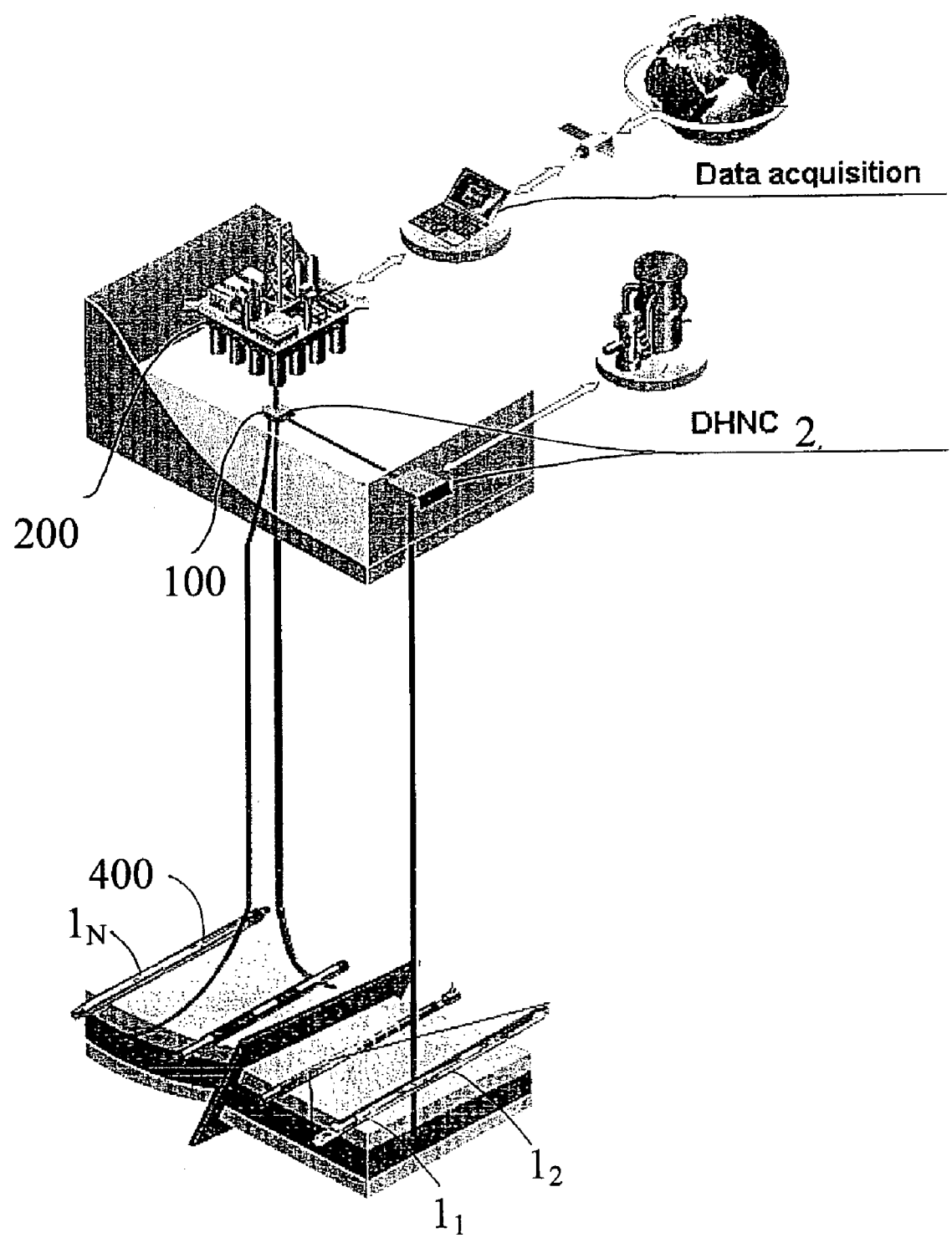
FIG. 1 illustrates a typical oil/gas well application in which the network according to present invention is used.
Figure 2:
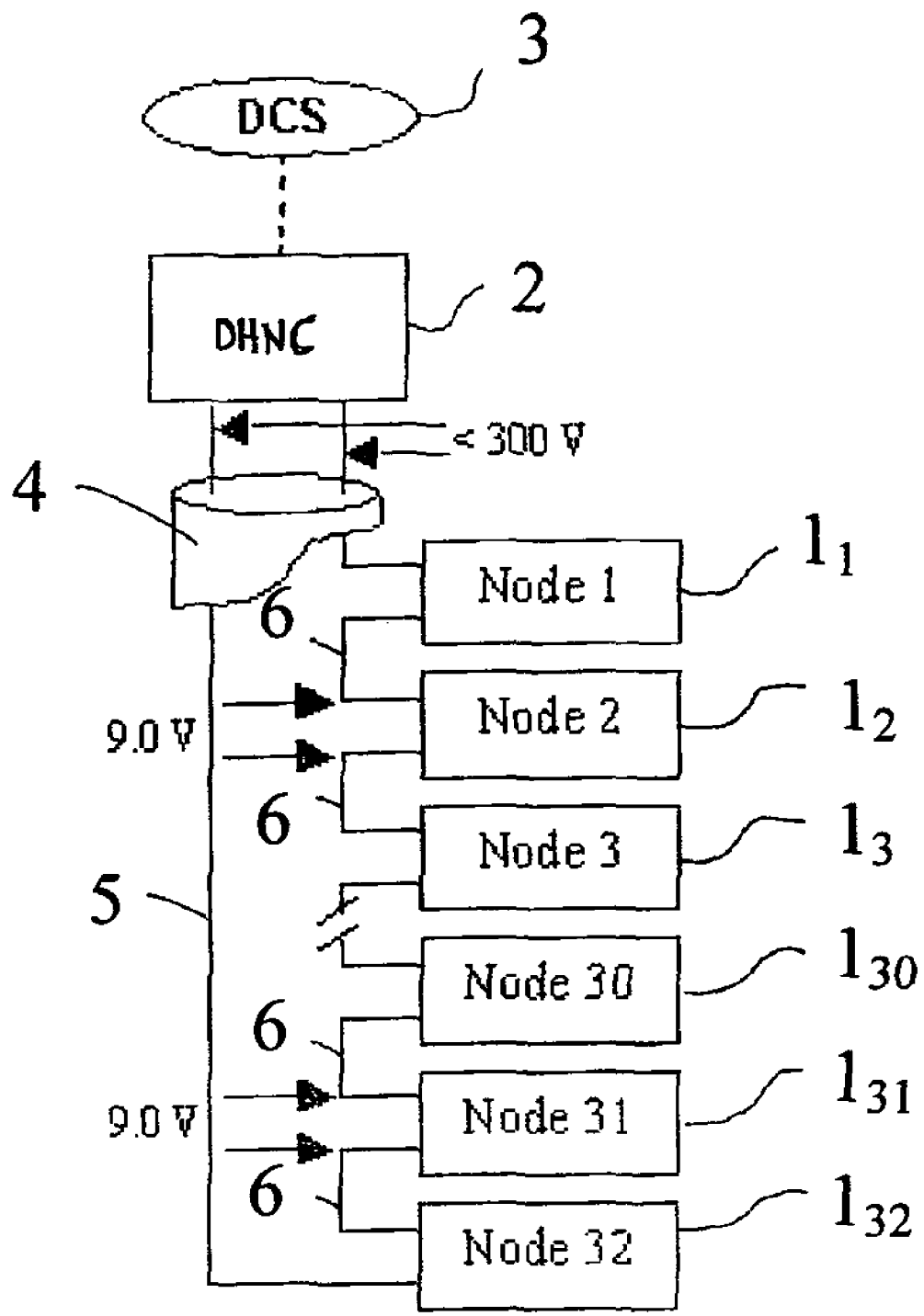
FIG. 2 shows a schematic illustration of a current loop of a network according to the invention.

Referring now to FIG. 2 there is shown a typical network loop configuration according to the invention, in this case illustrated as having 32 nodes. A cable 4 connects a number of nodes 11,12,13 . . . 131,132 to a downhole network controller (DHNC) 2. At least one of the nodes 11,12,13 . . . 131,132 is arranged as a downhole unit at a downhole location in order to enable gathering of downhole well or reservoir information from a downhole instrument or sensor or to enable the sending of information, e.g. commands, to a downhole instrument or control module. The network controller (DHNC) will typically be a part of or connected to a control system (DCS) 3. The control system typically comprises a topside control unit or a host facility process control system. The network controller 2 is typically located at one end of a signal/communication cable 4, and will in many situations be located on a surface installation, normally rack mounted. The control system may in one embodiment be realized as a distributed control system, for example by arranging the network controller 2 as part of a subsea application or installation 100 adapted for connecting a surface platform or vessel 200 to a well 400, as illustrated in FIG. 1.

FIG. 2 illustrates how nodes 11, . . . , 132 are connected in a series manner along a first conductor 6 of a basically two-conductor loop 5,6. Both conductors of the current loop are arranged in a cable 4. In one embodiment of the network according to the invention, the conductors 5,6 could be arranged as a twisted pair within the cable 4.

Figure 3:
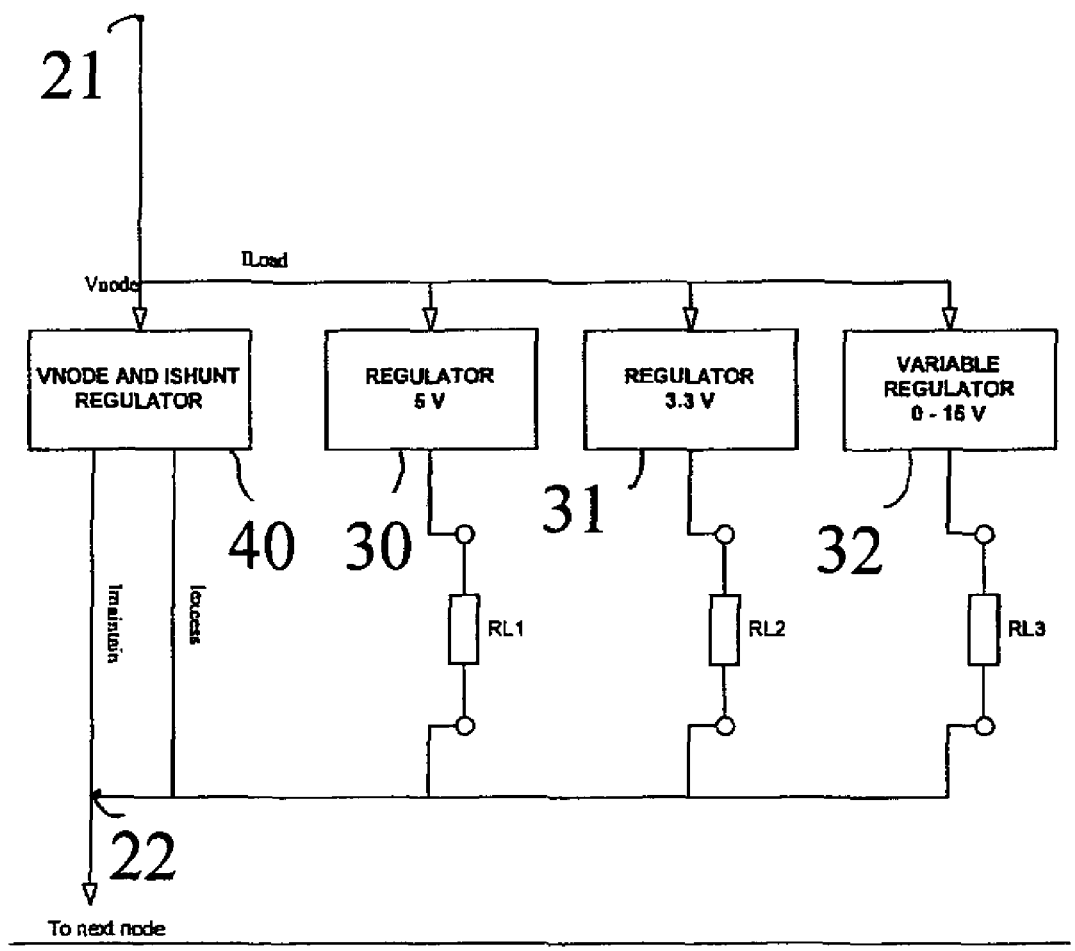
FIG. 3 is a functional block schematic of an example embodiment of a node of the electric network according to the invention.

The network controller 2 is designed as a constant-current source for the loop using circuit techniques otherwise known to person skilled in the art. FIG. 3 illustrates some of the main functional modules of a typical network node in a network according to the invention. The network node comprises of a node voltage and shunt current regulator (VNode and IShunt regulator 40) and one or more voltage regulators 30,31,32 which, with their respective loads, are connected in parallel, and powered by the VNode and IShunt regulator 40. The VNode and IShunt regulator 40 serves two main purposes: It regulates the DC input impedance of the node so that the voltage drop over the node is regulated to the minimum required to obtain the functionality chosen by the user, and it serves as a voltage source for input voltage to the internal regulators 30, 31 and 32. The parallel arrangement of the Vnode and Ishunt regulator 40 and the one or more voltage regulators 30,31,32 as illustrated in FIG. 3 are connected in a serial manner along the conductor 6 of the network current loop, as shown in FIG. 2. Thus the voltage regulators 30,31,32 may be adapted to serve different purposes such as node voltage regulators minimizing voltage over the node or to supply voltage regulators adapted to supply specific voltages to the different instruments in or coupled to the node.

The main purpose of the one or more voltage regulators 30,31,32 is to supply needed voltages to loads both internal and external to the node itself. This may include a 3.3V regulator 30 and/or a 5V regulator 31 in order to provide the most typical voltages used by electronic circuitry in the node, and a variable regulator 32 for providing other voltages. Each of the one or more voltage regulators 30,31,32 may optionally be connected to loads RL1,RL2 and/or RL3. The loads RL1, RL2 and/or RL3 can be internal or external to the node itself. In practice it is the voltage regulators with loads that are coupled in parallel, as is evident from the drawings.

The current consumption internally in a node is not constant. Normally such current variations will induce corresponding voltage and current variations on the network. However, since varying current consumption internally in the node, will be compensated by a corresponding variation in the "bypass" excess current, this variation will not induce any variation in the network loop current.

Figure 4:
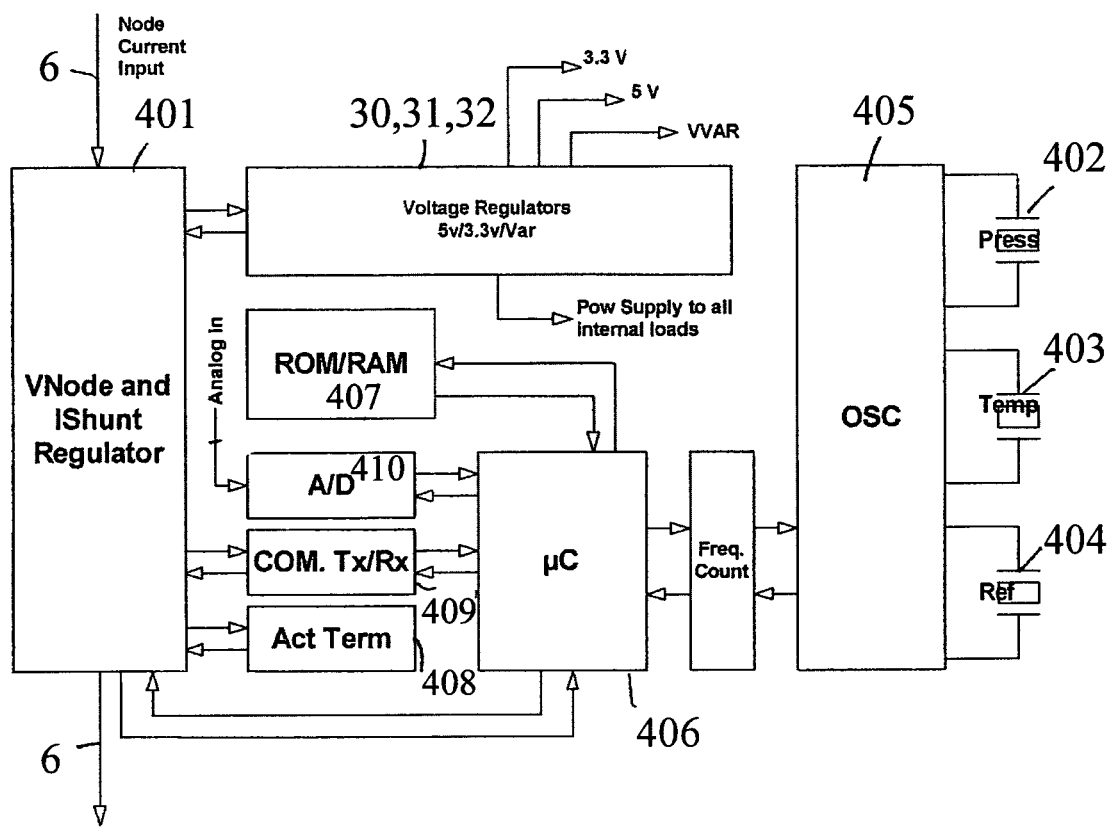
FIG. 4 illustrates in some more detail the hardware modules of an example embodiment of a node according to the invention.

The function of the VNode and IShunt Regulator 40 is to ensure that the voltage drop across the terminals of the node is regulated to the minimum required to obtain full functionality and to bypass the portion of the loop current that is not needed for internal or external loads. FIG. 4 illustrates in more detail the hardware modules of a typical network node where the VNode and IShunt Regulator 401 is adapted to control the node voltage in the above mentioned manner such that the loop current is passed through the node while ensuring that the voltage is kept on the minimum required and that the current not needed for internal or external loads is bypassed as "excess" current.

The node voltage control module 401 is provided with the required hardware for interfacing with the power regulators 30,31,32 and for interfacing with the microcontroller 406 in such a way that communication signals may be transmitted and received by the microcontroller, possibly via a dedicated communications module 408. In the preferred embodiment of the invention, the voltage control module ensures a chosen preliminary voltage over the node, e.g. in the range of 9.0V, but may change this as response to the specific situation and instruments implemented into the node.

As each down-hole node will regulate its voltage drop across the terminals to the minimum required to obtain full functionality there will be no excess heat dissipation due to poorly set supply voltage. A parallel connected network, in contrast, must allow for a flexible input voltage since each of the down-hole nodes see different cable voltage losses and therefore that the actual voltage seen by the node is unknown, each of the nodes must therefore maintain an internal supply voltage that is lower than the input voltage, and dissipate the excess power (voltage×current) as heat.

Since a varying internal load in a downhole node is compensated by a corresponding variation in the "bypass" excess current, the internal supply voltages will be inherently stable, and there will be no need for large capacitors to stabilize these voltages.

Since there are no large stabilizing capacitors internally in the node that will tend to eliminate the communication signal superimposed on the network loop current, there will be no need for large inductors to filter out the superimposed signal current. It can be readily extracted without the use of LC-filters.

Thus, one can avoid the two categories of components that are known for their poor reliability at high temperatures, namely large electrolytic capacitors and large high permeability core inductors.

FIG. 4 illustrates a downhole monitoring application in which a pressure sensitive transducer element 401 is connected as an external crystal to an oscillator circuit 405. Similarly, a temperature sensitive transducer element 403 is connected to said oscillator circuit 405. Finally, a reference element 404 is also connected to the oscillator circuit. The reference element 404 preferably has as low sensitivity to pressure and temperature variation as possible. The oscillator 405 is powered by one of the one or more voltage regulators 30,31,32 whose input power is taken from the current loop. The oscillator 405 provides a signal to a microcontroller 406 while the microcontroller may also provide an output for the oscillator 405, for example for allowing interrogation of each of the three external oscillator elements 402,403,404. The one or more voltage regulators 30,31,32 also provide power for a microprocessor module 406 and a digital memory module 407. The digital memory module 407 may comprise Read-Only-Memory (ROM) for storing a program, an algorithm or oscillator specific data in order to enable the microcontroller 406 to generate digital values representing the pressure and temperature experienced by the external transducer elements 402,403,404. In a downhole monitoring application the monitoring of pressure and temperature are typical parameters of interest. The digital memory module 407 could also comprise Random Access Memory (RAM) for allowing the updating of data or programs, as required by the application.

A transmit/receive (TX/RX) communications module 408 provides a connection between the microcontroller 406 and the current loop 5,6 of the network. The communications module 408 is adapted to convert a digital signal from the microcontroller, e.g. a signal representing the pressure or temperature, into a corresponding current modulation signal on the current loop 5,6. The current modulation signal is a modulation signal which will be superimposed on the current loop signal generated by the network controller. A superimposed current modulation signal can be sensed and demodulated by corresponding demodulation hardware and/or software associated with any other unit connected on the current loop, for example a node 1n or a network control unit 2.

In addition, the microcontroller may be provided with an input from an analog-to-digital converter 409, which enables the conversion of an analogue input signal 410 into a digital format, either for use in the microcontroller 406 or for transfer via the communications module 408 to the DHNC and possibly to a DCS.

Since the variation of load currents internally in a node do not induce corresponding current variations on the network, the network will be less noisy, and the superimposed communication signal will be easy to detect as it doesn't have to be extracted from other noise components.

Figures 5A, 5B:
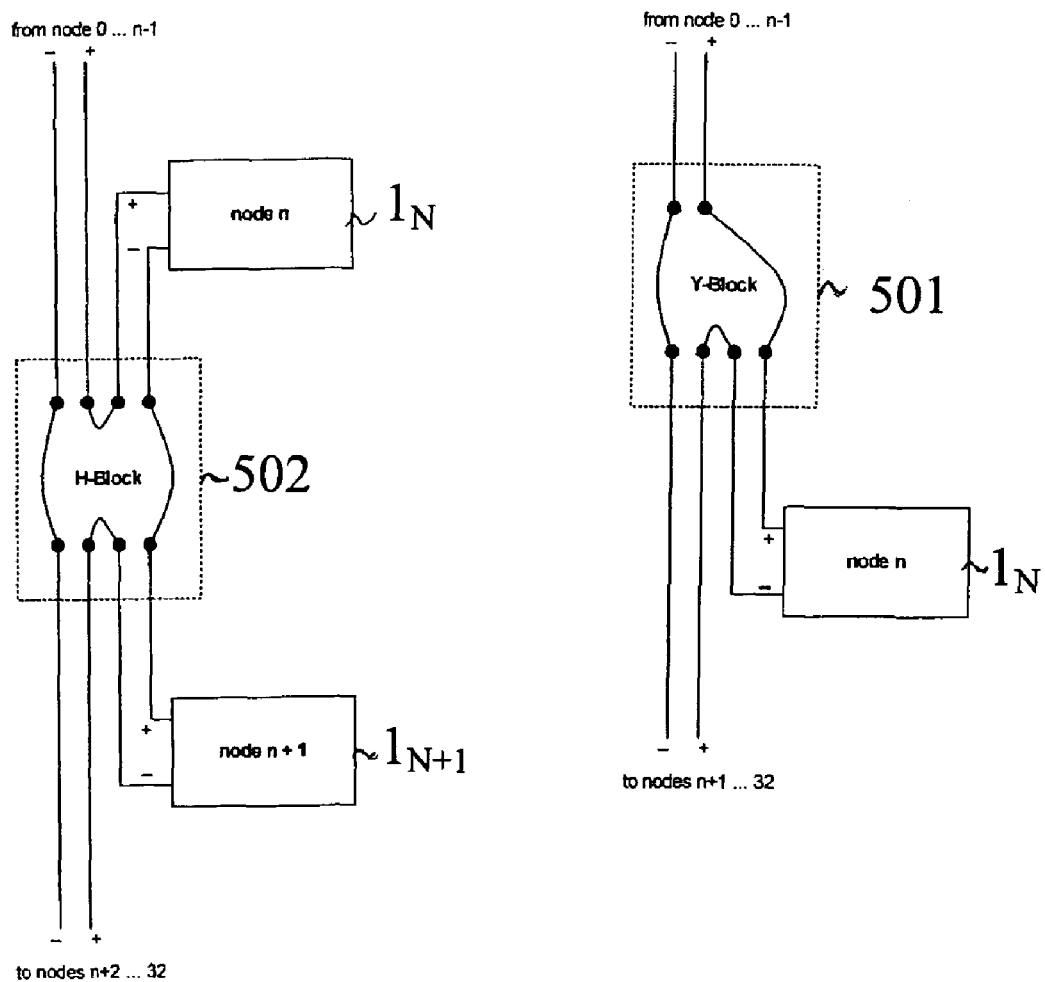
FIG. 5A-B illustrates schematically two types of connection blocks (H-block and Y-block, respectively) used to connect nodes to the conductors of the main loop of the network according to the invention.

FIGS. 5A-B illustrates two types of connection blocks 501,502 which can be used at a downhole location in order to provide a "branch-like" connection point for either a single node or two nodes. The Y-block 501 illustrated in FIG. 5A illustrates a connection block for connecting a single node In to the network current loop, while FIG. 5B illustrates an H-block 501 which can be used as a connection point common to two nodes 1n and 1n+1. Depending on the preferred or required locations of measurement positions along a downhole well tubing, a set of H-blocks and Y-blocks distributed along the well can provide the required or desired possibilities for connecting network nodes along the current loop of a downhole monitoring and/or control network.

Figure 6:
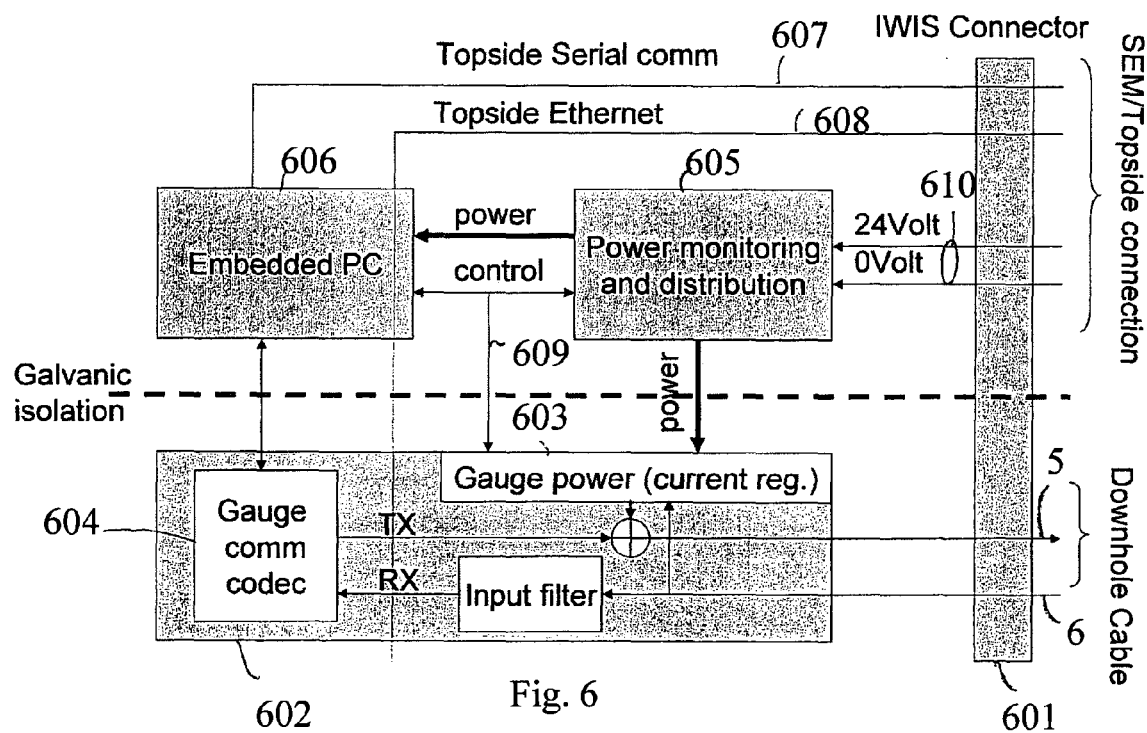
FIG. 6 is a detailed schematic of an example of a network controller normally arranged at one end of the network loop of the electric network according to the invention.

Typically, the connection blocks will be integral parts of the well tubing, hence their location and distribution are determined when the well tubing is connected and inserted in the well. FIG. 6 illustrates in more detail the various hardware modules of the Downhole Network Controller (DHNC) 2 connected to one end of the current loop 5,6 for supplying the network nodes with power and for communicating with the network nodes. FIG. 6 illustrates how the current loop 5,6 of the downhole monitoring and control network cable 4 is connected via a connector device, preferably an IWIS (Intelligent Well Interface Standard) connector 601 and via a power/communication signal splitter/combiner 602 to a gauge power unit 603 and to a gauge communications codec 604.

The gauge power unit 603 is adapted to provide a regulation of the loop current. Electric power is supplied to the gauge power unit 603 from a power monitoring and distribution unit 605. The purpose of the gauge power unit 603 is thus to enable measurement and regulation of the actual loop electric current, and the gauge power unit 603 is managed by suitable control hardware and/or software in the power monitoring and distribution module 606.

The gauge communication coding/decoding (comm. codec) unit 604 is typically connected to a main processing unit 606, for example realized as an embedded personal computer (PC). The main processing unit 606 is provided with hardware and software required for controlling the gauge comm. codec 604 and for receiving and sending communication signals on the current loop. The main processing unit 606 may also be connected to a topside serial communication link 607 and/or a topside Ethernet connection 608. A control line 609 enables exchange of control signals between the main processing unit 606, the power monitoring and distribution unit 605 and the gauge power unit 603. The power monitoring and distribution unit 605 is typically powered from a topside power supply (not illustrated), e.g. a standard 24 V supply via a conductor pair 610.

Preferably, galvanic isolation is provided between the gauge comm. codec 604 and the gauge power unit 603 on the one hand, and the modules which are connected to the topside equipment on the other hand. In this way, the downhole current loop will be galvanically isolated.

A number of advantages are obtained by providing a downhole monitoring and control network with a current loop according to the present invention. The use of a current loop avoids the high-input impedances normally required when transmitting voltages across long distances. At the same time, noise pick-up at signal input ends of such high-impedance voltage based networks are significantly reduced, as the current loop according to the present invention provides low impedance at each node interface with the cable conductors and also at the network controller interface with the cable. This means that the network will not be much affected by other electrically noisy equipment located nearby.

An advantage of having both of the wires of the current loop arranged inside the cable, is that it will be possible to provide a galvanically isolated power supply and communications line to all downhole units. In many downhole applications it is required that there is galvanic isolation between well ground and all electric conductors and components.

A communications signal is generated in the current loop by imposing low amplitude current modulation signal at the network controller. For this purpose the network controller is provided with a current modulation device adapted for imposing a current modulation on the current supplied on the current loop. Hence a communications signal will be available to all units connected on the loop, while information in the modulated current signal indicates to a node whether the information modulated onto the current carrier signal is intended for that node. Similarly, each node is provided with an internal communications driver 12 adapted for modulating the impedance across the external terminals 21, 22 of the node by letting the node voltage that is controlled by the VNode and IShunt regulator 40 have small square pulse deviations from the nominal node voltage. This will cause corresponding square pulse deviations in the node current which will in turn be detected by the network controller 2. Each node 1N is in most embodiments of the network according to the invention provided with an interface module 11 for interfacing external instruments 15, for example a sensor device or a control device.

To summarize, the preferred embodiment of the invention relates to an electric network and a power supply for this system, especially for measurement and control in an oil/gas well using transmission of electric signals and power. A current loop based network is arranged to provide both electric power and communications line from a top-side network controller to one or more downhole network nodes connected in the network, and where the aim of the current loop configuration is to:

- let each of the downhole network nodes be self-regulating so that the voltage drop across the terminals are regulated to the minimum voltage required to maintain node functionality. Thereby, excess heat dissipation and unnecessary high voltages in the downhole network nodes are avoided. Excessive voltages are known to be an ageing accelerator.
- let the network current be controlled and regulated by the top-side network controller with nominal current being set as an input-parameter in the top-side network controller.
- eliminate the need for large electrolytic capacitors to stabilize internal supply voltages in the downhole network node due to the configuration with "bypass of excess current".
- eliminate the need for large high permeability core inductors to filter the signal current from the power current.
- to eliminate the need for LC-filtering to extract signal current from the power current.
- provide a multinode downhole network where the current flowing in the loop is constant, irrespective of the number of connected nodes, and where the resistive loss in the network cable therefore is also independent of the number of nodes connected.
- provide a multinode down-hole network where the resistive losses are kept low due to the moderate current flowing in the network and where this is obtained without making the network node input impedance too high, as it would have been if all downhole network nodes were connected in parallel and the total cable current were kept at the same level.

TABLE I

| Parallel-coupled nodes | Four nodes in parallel. Low DC input impedance | 20 nodes in parallel. Low DC input impedance | 32 nodes in parallel. Low DC input impedance | 32 nodes in parallel. Increased DC input impedance to improve power efficiency | | |
|---|---|---|---|---|---|---|
| Cable resistance (one direction) [ohm/km] | 13 | 13 | 13 | 13 | 13 | 13 |
| Node Power Req [W] | 0.2 | 0.2 | 0.2 | 0.2 | 0.2 | 0.2 |
| Node Input Current [A] | 0.02 | 0.02 | 0.02 | 0.004 | 0.002 | 0.001 |
| Node Input Voltage [V] | 10 | 10 | 10 | 50 | 100 | 200 |
| Cable length [km] | 8 | 8 | 8 | 8 | 8 | 8 |
| Node DC Input Impedance [ohm] | 500 | 500 | 500 | 12500 | 50000 | 200000 |
| Number of nodes | 4 | 20 | 32 | 32 | 32 | 32 |
| Voltage drop in cable [V] | 16.64 | 83.20 | 133.12 | 26.62 | 13.31 | 6.66 |
| Cable power loss [W] | 1.33 | 33.28 | 85.20 | 3.41 | 0.85 | 0.21 |
| Power supplied to nodes [W] | 0.80 | 4.00 | 6.40 | 6.40 | 6.40 | 6.40 |
| Power efficiency | 0.38 | 0.11 | 0.07 | 0.65 | 0.88 | 0.97 |
| Cable Input Voltage [V] | 26.64 | 93.20 | 143.12 | 76.62 | 113.31 | 206.66 |
| Cable Input Power [W] | 2.13 | 37.28 | 91.60 | 9.81 | 7.25 | 6.61 |

TABLE II

| Series-coupled nodes | Four nodes in series. Low DC input impedance | 20 nodes in series. Low DC input impedance | 32 nodes in series. Low DC input impedance |
|---|---|---|---|
| Cable resistance (one direction) [ohms/km] | 13 | 13 | 13 |
| Node Power Req [W] | 0.2 | 0.2 | 0.2 |
| Node Input Current [A] | 0.02 | 0.02 | 0.02 |
| Node Input Voltage [V] | 10 | 10 | 10 |
| Cable length [km] | 8 | 8 | 8 |
| Node Input Resistance [ohm] | 500 | 500 | 500 |
| Number of nodes | 4 | 20 | 32 |
| Voltage drop in cable [V] | 4.16 | 4.16 | 4.16 |
| Cable power loss [W] | 0.08 | 0.08 | 0.08 |
| Power supplied to nodes [W] | 0.80 | 4.00 | 6.40 |
| Power efficiency | 0.91 | 0.98 | 0.99 |
| Cable Input Voltage [V] | 44.16 | 204.16 | 324.16 |
| Cable Input Power [W] | 0.88 | 4.08 | 6.48 |

The invention claimed is:

1. A power supply system for supplying power in an electric networking at least partially positioned in an oil or gas well comprising:
a network controller including an electric current supply and a current loop based network arranged to provide electric power to a number of network nodes in said network, said nodes being coupled in series in said current loop, and
wherein at least one of the network nodes includes a shunt device configured to maintain a nominal voltage across terminals of the node.

2. A system according to claim 1, wherein each of said nodes comprises at least one supply voltage regulator configured to supply one or more specific voltages to an instrument in said node.

3. A system according to claim 1, wherein each of said nodes is provided with at least one voltage regulator configured to regulate the voltage across the node to be at least a certain minimum voltage level.

4. The system according to claim 1, wherein said network controller is configured to provide a constant current to said loop.

5. The system according to claim 1, wherein said loop includes a cable having a twisted pair of electrical conductors.

6. The system according to claim 1, wherein said network controller and said nodes each include a communication unit configured to transmit a communication signal to said loop, and receive via the loop communication signals from other ones of said nodes.

7. The system according to claim 6, wherein said communication signal is applied as a modulation of current applied to the loop.

8. The system according to claim 1, further comprising a network for measurement and control in the oil or gas well using transmission of electric signals and supply of electric power, wherein said loop is a current loop based network configured to provide both electric power and a communications line from the network controller to one of the nodes positioned downhole connected in the network.

9. The system according to claim 8, wherein the current loop comprises a pair of conductors arranged in a cable, said cable configured to be arranged at least partly in the downhole, and where longitudinal sections of the cable are interconnected using a connection block, whereby the connection block defines a point of connection for at least one of the nodes.

10. The system according to claim 9, wherein the said two conductors in the cable are arranged in a twisted pair configuration.

11. The system according to claim 8, wherein at least one of said network nodes is arranged downhole for connecting an electric downhole module, to the network, and said network controller is configured to supply an electric supply current and a current modulation signal superimposed on said supply current to the at least one network node.

12. The system according to claim 1, wherein the shunt device is regulated by the node to bypass an amount of electric current comparable to a nominal loop current minus the load current, while ensuring that the voltage across the node is maintained at a certain minimum level.

13. The system according to claim 8 wherein every one of said nodes is connected in series in the current loop and whereby the full loop current also passes through the at least one network node.

14. The system according to claim 8, wherein said network controller is adapted for supplying a nominal electric loop current in the current loop of the network.

15. The system according to claim 1, wherein the nominal electric current is above 20 mA.

16. The system according to claim 1, wherein said nominal voltage is nine Volts.

17. The system according to claim 1, wherein each of the nodes is configured to regulate said nominal voltage drop across the terminals of said node.

18. The system according to claim 1, wherein each of the at least one nodes includes a Zener barrier device connected between input terminals of the nodes.

19. The system according to claim 1 wherein the current loop is galvanically isolated from a main body of a well tubing.

20. The system according to claim 1, wherein at least one of the nodes includes (Silicon-On-Insulator (SOI) technology.

21. A system according to claim 1, wherein at least one of said network nodes is configured to provide a power supply to at least one downhole module.

22. A system according to claim 1, wherein at least one topside node in the network is complies with the Intelligent Well Instrumentation Standard (IWIS) and is configured as a communication protocol and a physical interface with an external device.

* * * * *